US012613995B2

(12) United States Patent
Beck et al.

(10) Patent No.: US 12,613,995 B2
(45) Date of Patent: Apr. 28, 2026

(54) METHOD AND SYSTEM FOR PROVIDING AUTOMATED DATA REDACTION

(71) Applicant: JPMorgan Chase Bank, N.A., New York, NY (US)

(72) Inventors: Samuel Beck, East Brunswick, NJ (US); Iqbal M Khan, Glenview, IL (US); Radhika Tayal, Frisco, TX (US); Mihir Milind Mirajkar, Jersey City, NJ (US); Miltiadis Mitrakas, Brentwood (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 355 days.

(21) Appl. No.: 18/218,852

(22) Filed: Jul. 6, 2023

(65) Prior Publication Data
US 2025/0013786 A1      Jan. 9, 2025

(51) Int. Cl.
*G06F 21/62* (2013.01)
(52) U.S. Cl.
CPC ...... *G06F 21/6254* (2013.01); *G06F 21/6227* (2013.01)
(58) Field of Classification Search
CPC .......................... G06F 21/6254; G06F 21/6227
See application file for complete search history.

(56) References Cited

U.S. PATENT DOCUMENTS

| | | | |
|---|---|---|---|
| 2008/0112620 A1* | 5/2008 | Jiang | G06F 16/353 |
| | | | 382/181 |
| 2019/0020687 A1* | 1/2019 | Noon | G06F 21/31 |
| 2020/0097713 A1* | 3/2020 | Cramer | G06V 30/413 |
| 2022/0043935 A1* | 2/2022 | Brannon | G06F 16/335 |
| 2022/0269820 A1* | 8/2022 | Singh Bawa | G06F 18/214 |

FOREIGN PATENT DOCUMENTS

| | | | | |
|---|---|---|---|---|
| EP | 3798906 B1 * | 1/2025 | | G06V 10/22 |

* cited by examiner

*Primary Examiner* — Hee K Song
(74) *Attorney, Agent, or Firm* — Greenblum & Bernstein, P.L.C.

(57) ABSTRACT

A method for providing automated data redaction is disclosed. The method includes receiving a data set from a source, the data set including an unstructured electronic document and a structured electronic document; extracting, by using a model, texts from the data set; mapping each of the texts to a location in the data set, the location relating to a position of each of the texts on a page; determining, by using the model, whether the texts include restricted information; redacting the texts from the data set based on the mapping when the texts are determined to include restricted information; and generating a redacted data set based on a result of the redacting.

20 Claims, 6 Drawing Sheets

400

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

400

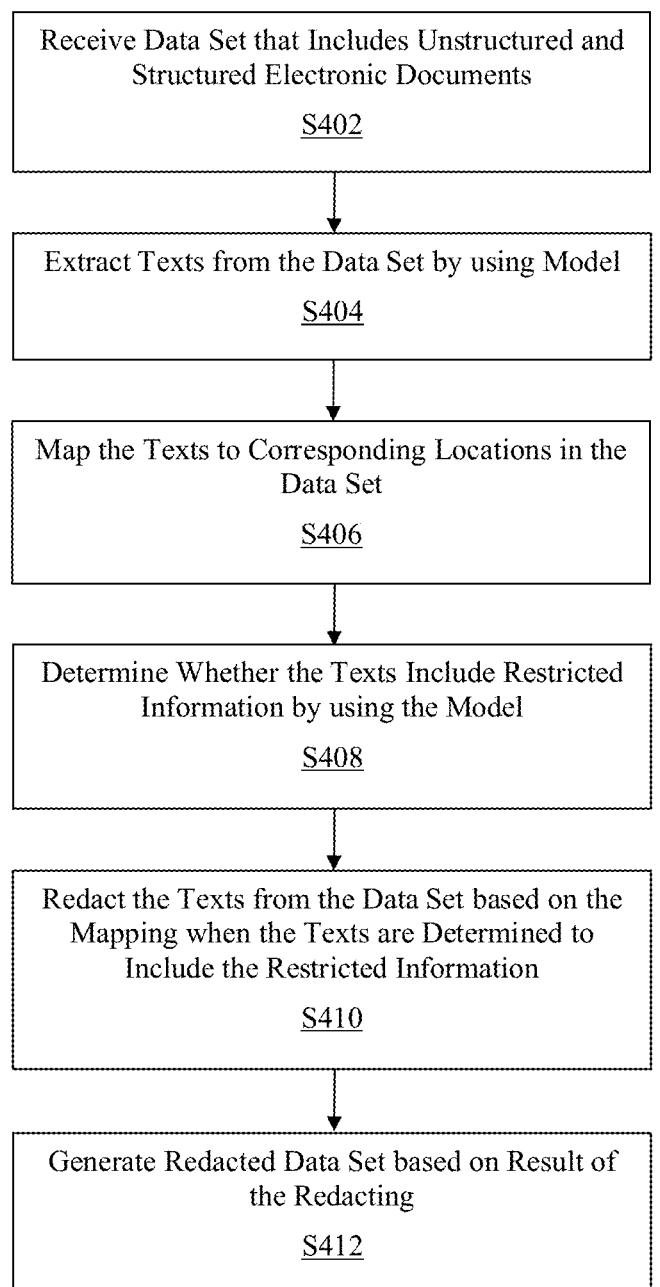

Receive Data Set that Includes Unstructured and
Structured Electronic Documents

S402

Extract Texts from the Data Set by using Model

S404

Map the Texts to Corresponding Locations in the
Data Set

S406

Determine Whether the Texts Include Restricted
Information by using the Model

S408

Redact the Texts from the Data Set based on the
Mapping when the Texts are Determined to
Include the Restricted Information

S410

Generate Redacted Data Set based on Result of
the Redacting

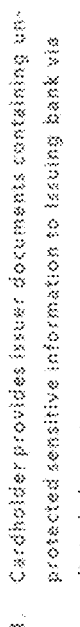

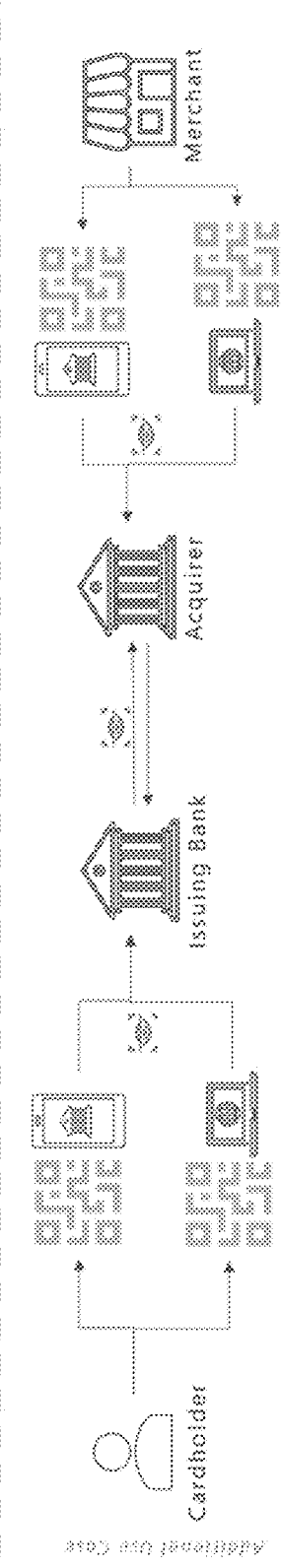

Cardholder   Issuing Bank   Acquirer   Merchant

1. Cardholder provides issuer documents containing un-protected sensitive information to issuing bank via digital channels 2. Issuing bank transmits the un-protected information to merchant's acquirer bank 3. Acquirer bank transmits the un-protected documents to merchant

*Current Business flow*

1. Cardholder provides issuer documents containing un-protected sensitive information to issuing bank via digital channels 2. Issuing bank transmits the un-protected information to merchant's acquirer bank 3. Software redacts and protects the sensitive information in the document 4. Protected information is transmitted to merchant

*Future Business flow*

Cardholder   Issuing Bank   Acquirer   Merchant

*Future Business flow – Additional Use Case*

METHOD AND SYSTEM FOR PROVIDING AUTOMATED DATA REDACTION

BACKGROUND

1. Field of the Disclosure

This technology generally relates to methods and systems for redacting data, and more particularly to methods and systems for providing automated redaction of structured and unstructured data sets in real-time by using artificial intelligence.

2. Background Information

Many business entities receive large quantities of data that must be efficiently processed to facilitate business operations and provide services for users. Often, these large quantities of data may include sensitive information such as, for example, customer account numbers that must be quickly identified and removed. Historically, implementations of conventional data redaction techniques have resulted in varying degrees of success with respect to effective and timely management of the large quantities of data.

One drawback of using the conventional data redaction techniques is that in many instances, the sensitive information may be embedded in a variety of structured and unstructured data sets. As a result, redaction of the sensitive information may be resource intensive and inconsistent from one data set to another because of required standardization. Additionally, due to various data conversions that are required to standardize the unstructured data sets, integrity of output documents may be compromised as a consequence of repeated data transformations.

Therefore, there is a need to automatically remove sensitive information from large quantities of structured and unstructured data sets in real-time without compromising document integrity to facilitate compliance with regulatory and industry standards.

SUMMARY

The present disclosure, through one or more of its various aspects, embodiments, and/or specific features or sub-components, provides, inter alia, various systems, servers, devices, methods, media, programs, and platforms for providing automated redaction of structured and unstructured data sets in real-time by using artificial intelligence.

According to an aspect of the present disclosure, a method for providing automated data redaction is disclosed. The method is implemented by at least one processor. The method may include receiving a data set from a source, the data set may include at least one from among an unstructured electronic document and a structured electronic document; extracting, by using at least one model, at least one text from the data set; mapping the at least one text to a location in the data set, the location may relate to a position of the at least one text on a page; determining, by using the at least one model, whether the at least one text includes restricted information; redacting the at least one text from the data set based on the mapping when the at least one text is determined to include restricted information; and generating a redacted data set based on a result of the redacting.

In accordance with an exemplary embodiment, data in the data set may relate to private user information that is received via a graphical user interface of an application on a user device as well as via an application programming interface, the application may include at least one from among a mobile application and a web application.

In accordance with an exemplary embodiment, the unstructured electronic document may include at least one from among a monochromatic visual representation and a polychromatic visual representation of information that relates to at least one from among an electronic image, an electronic picture, and an electronic photograph.

In accordance with an exemplary embodiment, the method may further include determining a destination for the data set based on information that is associated with the data set; and transmitting the redacted data set to the determined destination in place of the data set.

In accordance with an exemplary embodiment, to extract the at least one text from the data set, the method may further include processing, by using an image processing library, the data set; identifying, by using the at least one model, the at least one text from the processed data set based on at least one pattern logic; and extracting, by using the at least one model, the identified at least one text.

In accordance with an exemplary embodiment, to determine whether the at least one text includes restricted information, the method may further include identifying, by using the at least one model, at least one contextual element that is associated with the at least one text; and determining, by using the at least one model, whether the at least one text includes the restricted information based on the at least one corresponding contextual element and a restricted information library.

In accordance with an exemplary embodiment, the method may further include receiving, via a graphical user interface as well as via an application programming interface, at least one restriction requirement, the at least one restriction requirement may include at least one from among a policy and a regulatory guideline that defines the restricted information; and updating the restricted information library based on the at least one restriction requirement.

In accordance with an exemplary embodiment, the redacted data set may correspond to a redacted reproduction of the data set with mirroring data structure and content, the redacted data set may include data in a data format that corresponds to the data set.

In accordance with an exemplary embodiment, the at least one model may include at least one from among a machine learning model, natural language processing model, a statistical model, a mathematical model, a process model, and a data model.

According to an aspect of the present disclosure, a computing device configured to implement an execution of a method for providing automated data redaction is disclosed. The computing device including a processor; a memory; and a communication interface coupled to each of the processor and the memory, wherein the processor may be configured to receive a data set from a source, the data set may include at least one from among an unstructured electronic document and a structured electronic document; extract, by using at least one model, at least one text from the data set; map the at least one text to a location in the data set, the location may relate to a position of the at least one text on a page; determine, by using the at least one model, whether the at least one text includes restricted information; redact the at least one text from the data set based on the mapping when the at least one text is determined to include restricted information; and generate a redacted data set based on a result of the redacting.

In accordance with an exemplary embodiment, data in the data set may relate to private user information that is received via a graphical user interface of an application on a user device as well as via an application programming interface, the application may include at least one from among a mobile application and a web application.

In accordance with an exemplary embodiment, the unstructured electronic document may include at least one from among a monochromatic visual representation and a polychromatic visual representation of information that relates to at least one from among an electronic image, an electronic picture, and an electronic photograph.

In accordance with an exemplary embodiment, the processor may be further configured to determine a destination for the data set based on information that is associated with the data set; and transmit the redacted data set to the determined destination in place of the data set.

In accordance with an exemplary embodiment, to extract the at least one text from the data set, the processor may be further configured to process, by using an image processing library, the data set; identify, by using the at least one model, the at least one text from the processed data set based on at least one pattern logic; and extract, by using the at least one model, the identified at least one text.

In accordance with an exemplary embodiment, to determine whether the at least one text includes restricted information, the processor may be further configured to identify, by using the at least one model, at least one contextual element that is associated with the at least one text; and determine, by using the at least one model, whether the at least one text includes the restricted information based on the at least one corresponding contextual element and a restricted information library.

In accordance with an exemplary embodiment, the processor may be further configured to receive, via a graphical user interface as well as via an application programming interface, at least one restriction requirement, the at least one restriction requirement may include at least one from among a policy and a regulatory guideline that defines the restricted information; and update the restricted information library based on the at least one restriction requirement.

In accordance with an exemplary embodiment, the redacted data set may correspond to a redacted reproduction of the data set with mirroring data structure and content, the redacted data set may include data in a data format that corresponds to the data set.

In accordance with an exemplary embodiment, the at least one model may include at least one from among a machine learning model, natural language processing model, a statistical model, a mathematical model, a process model, and a data model.

According to an aspect of the present disclosure, a non-transitory computer readable storage medium storing instructions for providing automated data redaction is disclosed. The storage medium including executable code which, when executed by a processor, may cause the processor to receive a data set from a source, the data set may include at least one from among an unstructured electronic document and a structured electronic document; extract, by using at least one model, at least one text from the data set; map the at least one text to a location in the data set, the location may relate to a position of the at least one text on a page; determine, by using the at least one model, whether the at least one text includes restricted information; redact the at least one text from the data set based on the mapping when the at least one text is determined to include restricted information; and generate a redacted data set based on a result of the redacting.

In accordance with an exemplary embodiment, data in the data set may relate to private user information that is received via a graphical user interface of an application on a user device as well as via an application programming interface, the application may include at least one from among a mobile application and a web application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for providing automated redaction of structured and unstructured data sets in real-time by using artificial intelligence.

FIG. 5 is a flow diagram of an exemplary process for implementing a method for providing automated redaction of structured and unstructured data sets in real-time by using artificial intelligence.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
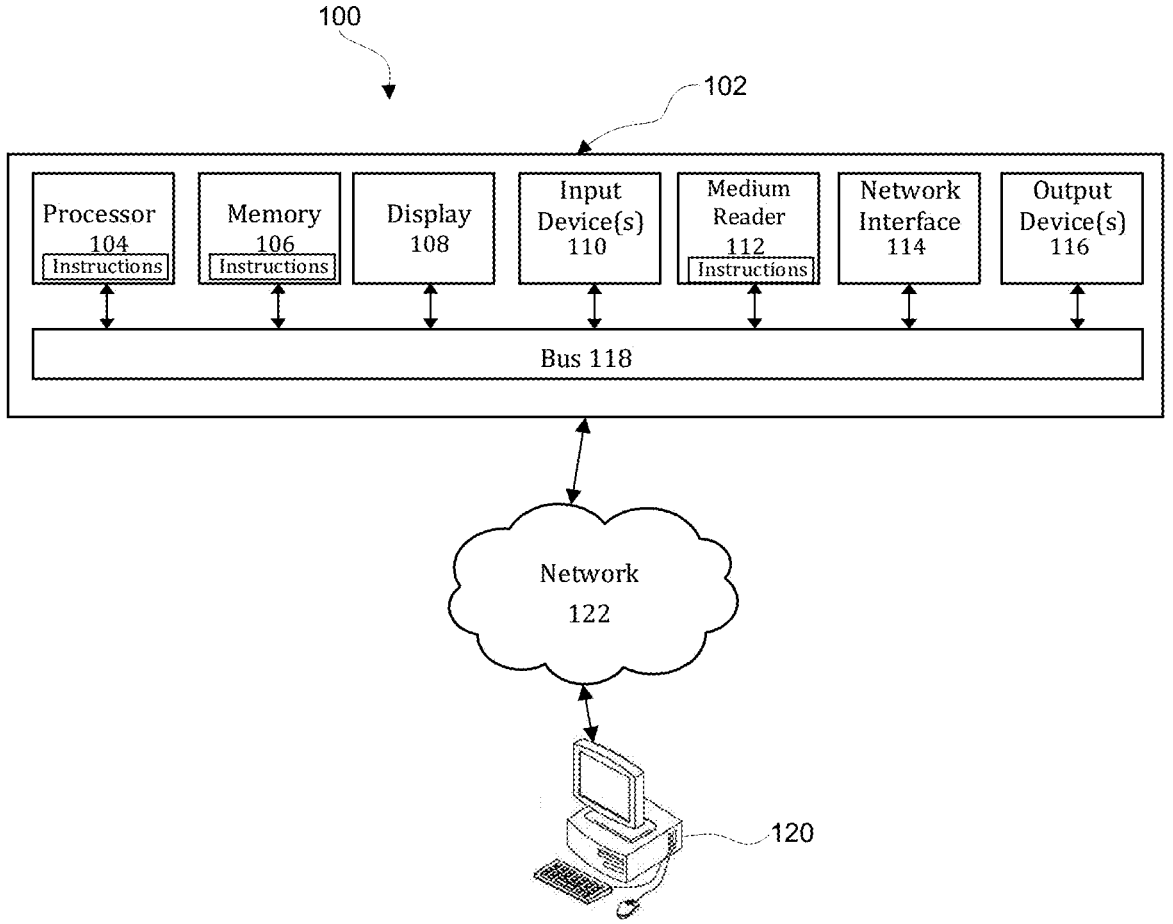
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing automated redaction of structured and unstructured data sets in real-time by using artificial intelligence.

Figure 2:
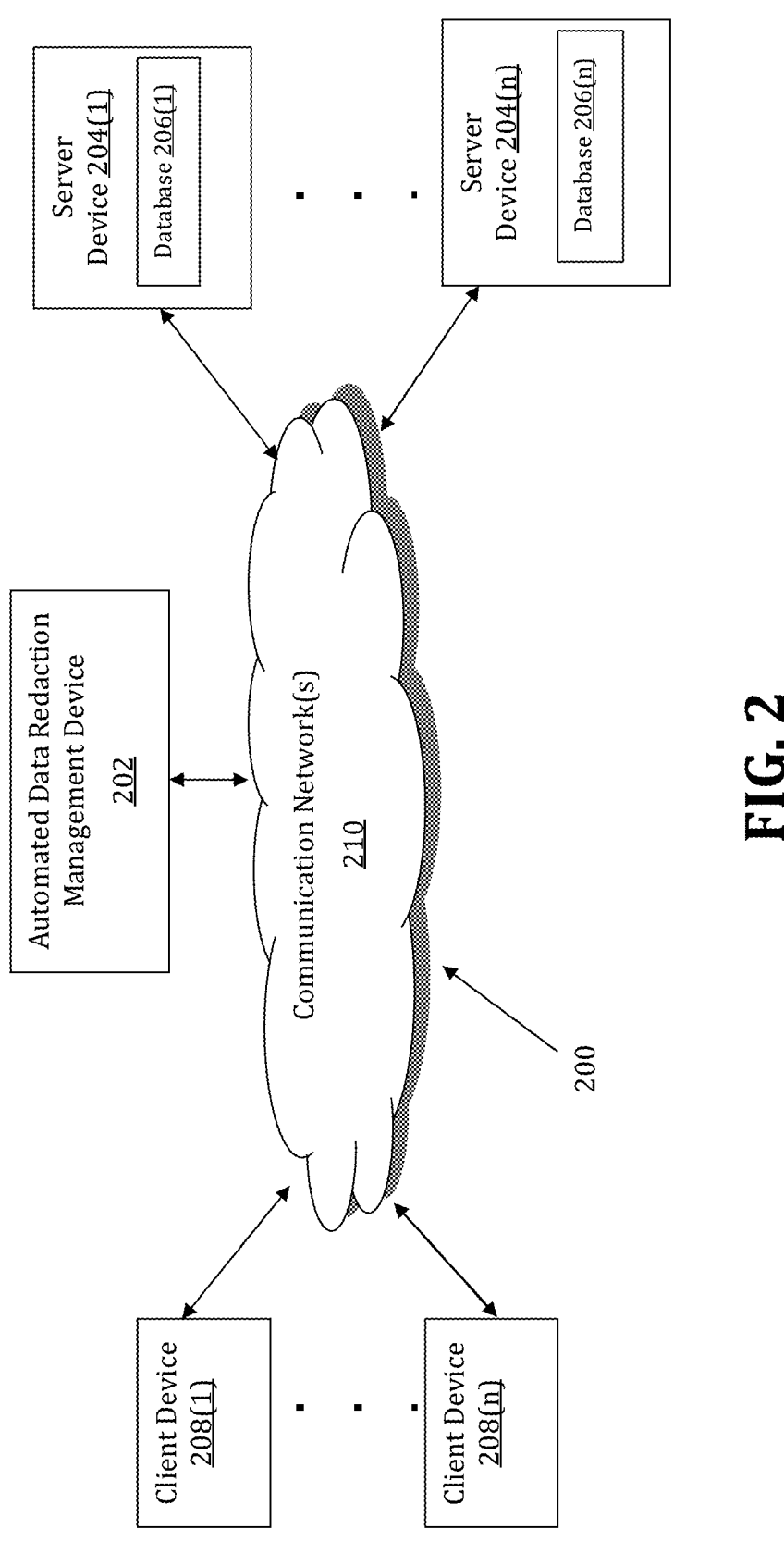
FIG. 2 illustrates an exemplary diagram of a network environment.

Referring to FIG. 2, a schematic of an exemplary network environment 200 for implementing a method for providing automated redaction of structured and unstructured data sets in real-time by using artificial intelligence is illustrated. In an exemplary embodiment, the method is executable on any networked computer platform, such as, for example, a personal computer (PC).

The method for providing automated redaction of structured and unstructured data sets in real-time by using artificial intelligence may be implemented by an Automated Data Redaction Management (ADRM) device 202. The ADRM device 202 may be the same or similar to the computer system 102 as described with respect to FIG. 1. The ADRM device 202 may store one or more applications that can include executable instructions that, when executed by the ADRM device 202, cause the ADRM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADRM device 202 itself, may be located in virtual server(s) running in a cloud-based computing environment rather than being tied to one or more specific physical network computing devices. Also, the application(s) may be running in one or more virtual machines (VMs) executing on the ADRM device 202. Additionally, in one or more embodiments of this technology, virtual machine(s) running on the ADRM device 202 may be managed or supervised by a hypervisor.

In the network environment 200 of FIG. 2, the ADRM device 202 is coupled to a plurality of server devices 204(1)-204(n) that hosts a plurality of databases 206(1)-206(n), and also to a plurality of client devices 208(1)-208(n) via communication network(s) 210. A communication interface of the ADRM device 202, such as the network interface 114 of the computer system 102 of FIG. 1, operatively couples and communicates between the ADRM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADRM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ADRM devices that efficiently implement a method for providing automated redaction of structured and unstructured data sets in real-time by using artificial intelligence.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADRM device 202 may be a standalone device or integrated with one or more other devices or apparatuses, such as one or more of the server devices **204(1)-204(*n*), for example. In one particular example, the ADRM device 202 may include or be hosted by one of the server devices 204(1)-204(*n*), and other arrangements are also possible. Moreover, one or more of the devices of the ADRM device 202** may be in a same or a different communication network including one or more public, private, or cloud networks, for example.

The plurality of server devices **204(1)-204(*n*) may be the same or similar to the computer system 102 or the computer device 120 as described with respect to FIG. 1, including any features or combination of features described with respect thereto. For example, any of the server devices 204(1)-204** (*n*) may include, among other features, one or more processors, a memory, and a communication interface, which are coupled together by a bus or other communication link, although other numbers and/or types of network devices may be used. The server devices **204(1)-204(*n*) in this example may process requests received from the ADRM device 202 via the communication network(s) 210** according to the HTTP-based and/or JavaScript Object Notation (JSON) protocol, for example, although other protocols may also be used.

The server devices **204(1)-204(*n*) may be hardware or software or may represent a system with multiple servers in a pool, which may include internal or external networks. The server devices 204(1)-204(*n*) hosts the databases 206(1)-206** (*n*) that are configured to store data that relates to data sets, unstructured electronic documents, structured electronic documents, machine learning models, texts, mappings, locations, positions, restricted information, redacted data sets, private user information, and sensitive information.

Although the server devices **204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*)** operates to manage and/or otherwise coordinate operations of the other network computing devices.

The server devices **204(1)-204(*n*)** may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices **208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the ADRM device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208** is a wireless mobile communication device, i.e., a smart phone.

The client devices **208(1)-208(*n*) may run interface applications, such as standard web browsers or standalone client applications, which may provide an interface to communicate with the ADRM device 202 via the communication network(s) 210 in order to communicate user requests and information. The client devices 208(1)-208(*n*)** may further include, among other features, a display device, such as a display screen or touchscreen, and/or an input device, such as a keyboard, for example.

Although the exemplary network environment 200 with the ADRM device 202, the server devices **204(1)-204(*n*), the client devices 208(1)-208(*n*), and the communication network(s) 210** are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADRM device 202, the server devices **204(1)-204(*n*), or the client devices 208(1)-208(*n*), for example, may be configured to operate as virtual instances on the same physical machine. In other words, one or more of the ADRM device 202, the server devices 204(1)-204(*n*), or the client devices 208(1)-208(*n*) may operate on the same physical device rather than as separate devices communicating through communication network(s) 210. Additionally, there may be more or fewer ADRM devices 202, server devices 204(1)-204(*n*), or client devices 208(1)-208(*n*) than illustrated in FIG. 2**.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
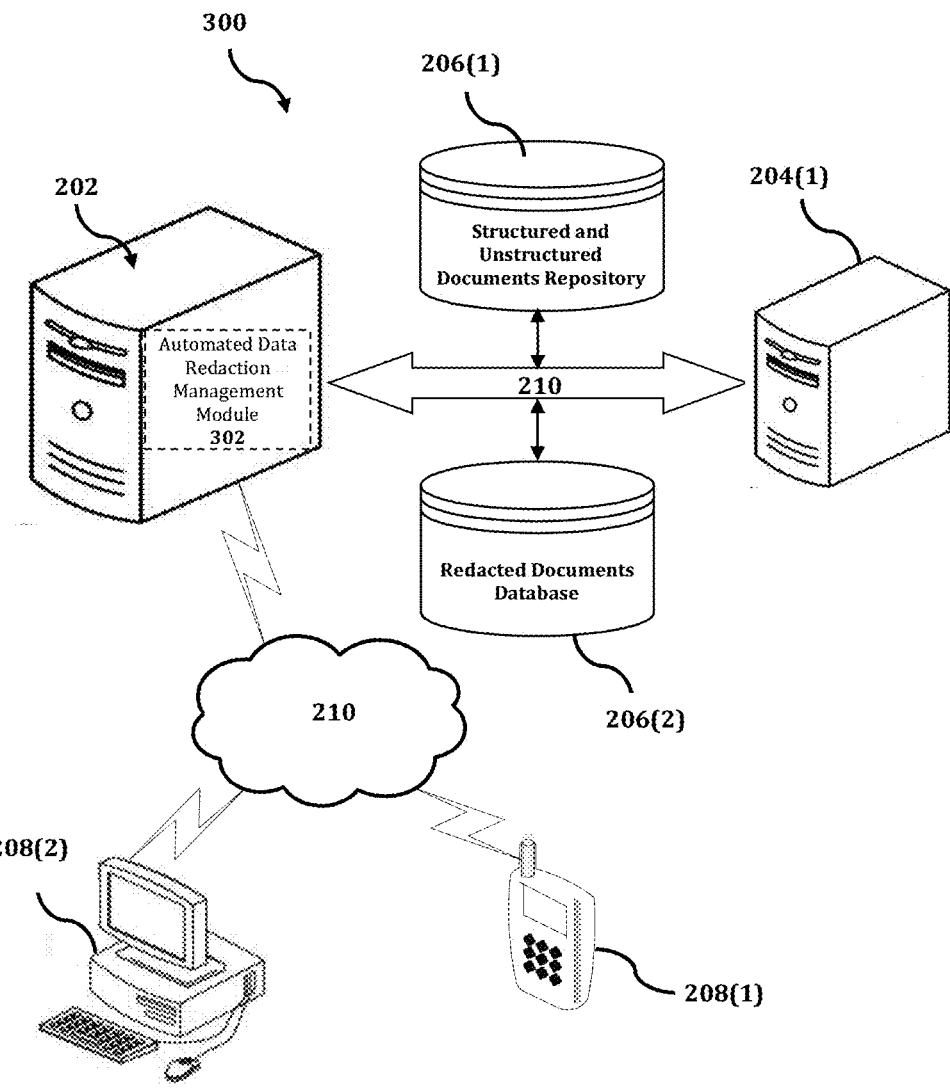
FIG. 3 shows an exemplary system for implementing a method for providing automated redaction of structured and unstructured data sets in real-time by using artificial intelligence.

The ADRM device 202 is described and shown in FIG. 3 as including an automated data redaction management module 302, although it may include other rules, policies, modules, databases, or applications, for example. As will be described below, the automated data redaction management module 302 is configured to implement a method for providing automated redaction of structured and unstructured data sets in real-time by using artificial intelligence.

An exemplary process 300 for implementing a mechanism for providing automated redaction of structured and unstructured data sets in real-time by using artificial intelligence by utilizing the network environment of FIG. 2 is shown as being executed in FIG. 3. Specifically, a first client device 208(1) and a second client device 208(2) are illustrated as being in communication with ADRM device 202. In this regard, the first client device 208(1) and the second client device 208(2) may be "clients" of the ADRM device 202 and are described herein as such. Nevertheless, it is to be known and understood that the first client device 208(1) and/or the second client device 208(2) need not necessarily be "clients" of the ADRM device 202, or any entity described in association therewith herein. Any additional or alternative relationship may exist between either or both of the first client device 208(1) and the second client device 208(2) and the ADRM device 202, or no relationship may exist.

Further, ADRM device 202 is illustrated as being able to access a structured and unstructured documents repository 206(1) and a redacted documents database 206(2). The automated data redaction management module 302 may be configured to access these databases for implementing a method for providing automated redaction of structured and unstructured data sets in real-time by using artificial intelligence.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADRM device 202 via broadband or cellular communication. Of course, these embodiments are merely exemplary and are not limiting or exhaustive.

Upon being started, the automated data redaction management module 302 executes a process for providing automated redaction of structured and unstructured data sets in real-time by using artificial intelligence. An exemplary process for providing automated redaction of structured and unstructured data sets in real-time by using artificial intelligence is generally indicated at flowchart 400 in FIG. 4.

In the process 400 of FIG. 4, at step S402, data sets may be received from a variety of sources. The data sets may include at least one from among an unstructured electronic document and a structured electronic document. In an exemplary embodiment, the unstructured electronic documents may include at least one from among a monochromatic visual representation and a polychromatic visual representation of information. The monochromatic visual representation and the polychromatic visual representation of information may each relate to at least one from among an electronic image, an electronic picture, and an electronic photograph. Consistent with present disclosures, the unstructured electronic document may include any digital document such as, for example, a document in a portable document format (PDF) and an image in a joint photographic experts group (JPEG) format.

In another exemplary embodiment, the structured electronic documents may include at least one from among a monochromatic visual representation and a polychromatic visual representation of information that have been previously processed into a standard format. The standard format may correspond to a computer readable format that represents the information. For example, the structured electronic documents may include an image vector that numerically represents data from a digital image.

In another exemplary embodiment, data in the data set may relate to private user information that is received via a graphical user interface of an application that is on a user device. The application may include at least one from among a mobile application and a web application. For example, a user may interact with the graphical user interface of the application to provide bank statements, which include private user information such as account numbers, as evidence to disputed charges. In another exemplary embodiment, the data in the data set may relate to user information that is received and/or retrieved via an application programming interface. The application programming interface may be usable to interact with various image capture and processing components to receive and/or retrieve the data. The image capture and processing components may include at least one from among a facsimile transmission component, an email component, a messaging component, a download management component, and an image scanning component.

In another exemplary embodiment, the web application may correspond to application software that runs on a web server. Unlike computer-based software programs that run locally on the operating system of a device, the web application may be accessed by the user through a web browser with an active network connection. The web application may be programmed by using a client-server modeled structure wherein the user is provided services via an off-site server. The off-site server may include first-party off-site servers as well as third-party off-site servers.

In another exemplary embodiment, the mobile application may relate to a type of application software that is designed to run on a mobile device such as, for example, a smartphone, a tablet computer, or a smart watch. The mobile application may serve to provide users with similar services to those accessed on personal computers. The mobile application may be small, individual software unit with focused functionalities.

At step S404, texts may be extracted from the data set by using a model. The texts may be extracted from the data set in real-time as the data sets are received. In an exemplary embodiment, the texts may relate to language data that are represented by characters. The characters may include at least one from among a numeric character, an alphabetic character, and a symbolic character. In another exemplary embodiment, the texts may be extracted from the data set by using a batch processing technique as well as in near real-time as the data sets are received. The batch processing technique may relate to the aggregating of a plurality of data sets into a batch prior to the extraction process. For example, the plurality of data sets may be aggregated for processing together as a batch.

In another exemplary embodiment, to extract the texts from the data sets, the data sets may be processed by using an image processing library. The image processing library may relate to a collection of programs and/or software packages that are made generally available to facilitate image processing tasks and analysis functions. The image processing tasks may include, for example, a reading task, a rescaling task, and a saving in different image formats task. The image processing library may be usable to extract the texts from various types of data in the data sets. The various types of data may include at least one from among handwritten data and printed data that are produced by using a computing device and an associated peripheral such as, for example, a printer. For example, the image processing library may be usable to extract the texts from a picture of a handwritten note. Consistent with present disclosures, the claimed invention may be usable to process the picture of the handwritten note to identify sensitive information as well as to redact the identified sensitive information from the picture.

Then, the texts may be identified from the processed data sets based on pattern logic. Consistent with present disclosures, the texts may be identified from the processed data sets by using the model. The pattern logic may relate to an ability of the model to discover meaningful patterns in known and unknown situations as well as in predictable and unpredictable situations. The pattern logic may correspond to pattern recognition as used in machine learning algorithms to identify patterns consistent with present disclosures. Finally, the identified texts may be extracted from the processed data sets by using the model.

In another exemplary embodiment, the model may include at least one from among a natural language processing model, a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the machine learning process may include a neural network that relates to at least one from among an artificial neural network and a simulated neural network. The neural network may correspond to a technique in artificial intelligence that teaches computers to process data by using interconnected processing nodes and/or artificial neurons. The neural network may relate to a type of machine learning such as, for example, deep learning that uses interconnected nodes and/or artificial neurons in a layered structure to transform inputs for predictive analytics.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S406, the texts may be mapped to a location in the corresponding data sets. The location may relate to a position of the texts on a page. In an exemplary embodiment, the position of each of the texts may be determined. The position may correspond to the specific place on the page where the text may be found. Consistent with present disclosures, each of the electronic documents may include a plurality of pages, each of which are sections of stored data. A page in an electronic document may be determined by an amount of information that may be displayed on a screen at one time.

In another exemplary embodiment, the location mapping may be associated with the corresponding texts. Each of the texts may be associated with a location in the corresponding electronic document where the texts may be found. Consistent with present disclosures, the location of the texts may be usable to facilitate the redaction of the texts. For example, redaction of the texts may include obscuring the location where the texts are found.

At step S408, whether the texts include restricted information may be determined by using the model. The determination may be made in real-time by using the model. In an exemplary embodiment, the restricted information may correspond to sensitive information such as, for example, personally identifiable information. The restricted information may include user information such as, for example, an account number as well as entity information such as, for example, a trade secret. Consistent with present disclosures, the restricted information may be predetermined based on a user preference and/or a regulatory requirement.

In another exemplary embodiment, the determination may be facilitated by using a batch processing technique and the model. The determination may also be made in near real-time by using the model. The batch processing technique may relate to the aggregating of a plurality of texts into a batch prior to the determination. For example, the plurality of texts may be aggregated for determining together as a batch.

In another exemplary embodiment, to determine whether the texts include restricted information, contextual elements that are associated with the texts may be identified. The contextual elements may be identified by using the model. The contextual elements may correspond to a collection of alphabetic, numeric, and symbolic characters such as, for example, a word that provide the circumstances that form the setting for an event, statement, or idea, and in terms of which it can be fully understood and assessed.

The contextual elements may relate to objects in a natural language that provides and/or clarifies the meaning of the texts. For example, the contextual elements may include an account designator indicating that a successive sequence of numbers corresponds to an account number. Additionally, the contextual elements may include the texts. That is, the texts themselves may be usable to determine meaning. For example, texts that include a sequence of twelve numbers may be interpreted to be account numbers. Consistent with present disclosures, the account numbers may include any combination of alphabetic, numeric, and symbolic characters.

Then, whether the texts include the restricted information may be determined based on the corresponding contextual elements and a restricted information library. Consistent with present disclosures, whether the texts include the restricted information may be determined by using the model. The restricted information library may include a collection of distinct meaningful elements of language such as, for example, words and phrases that have been predetermined to be sensitive and/or private information. For example, the restricted information library may include specific words and phrases that are to be redacted based on a user preference.

The restricted information library may also include a collection of rules and/or regulations that define a type of information as sensitive and/or private information. For example, the restricted information library may include a rule that defines account numbers as sensitive and/or private information that must be redacted.

In another exemplary embodiment, restriction requirements may be received via a graphical user interface. The restriction requirements may include at least one from among a policy and a regulatory guideline that defines the restricted information. For example, a user may interact with the graphical user interface to provide a new restriction requirement for the redaction of account numbers. In another exemplary embodiment, the restriction requirements may be received and/or retrieved via an application programming interface. Consistent with present disclosures, the application programming interface may be usable to interact with various image capture and processing components to receive and/or retrieve the restriction requirements. The image capture and processing components may include at least one from among a facsimile transmission component, an email component, a messaging component, a download management component, and an image scanning component.

The restriction requirements may be automatically aggregated from a source such as, for example, a regulatory agency by using an application programming interface. For example, updated guidance from the regulatory agency may be automatically aggregated via the application programming interface and automatically processed to identify new restriction requirements. Then, the restricted information library may be updated based on the restriction requirements. The restriction requirements may replace old corresponding requirements in the restricted information library.

At step S410, the texts may be redacted from the data set based on the mapping when the texts are determined to include restricted information. In an exemplary embodiment, the redaction process may include an obscuring of the texts by using the mapping. For example, the mapping may provide the specific location of the texts in an electronic document to obscure. In another exemplary embodiment, the redaction process may include the removal of the texts from the electronic document by using the mapping. For example, the mapping may provide the specific location of the texts in an electronic document to remove.

At step S412, redacted data sets may be generated based on a result of the redacting. The redacted data sets may be generated to correspond to each of the data sets. In an exemplary embodiment, the redacted data sets may correspond to redacted reproductions of the corresponding data sets with mirroring data structure and content. For example, redacted data set A* may be a direct reproduction of data set A with relevant texts redacted. Redacted data set A* may structurally mirror data set A and include the same content. The redacted data sets may include data in a data format that corresponds to the data sets. For example, redacted data set B*, which corresponds to data set B, may be generated in a digital image format because data set B includes data in the digital image format.

In another exemplary embodiment, a destination for the data sets may be determined based on information that is associated with the data set. The information that is associated with the data sets may include external data such as, for example, metadata that describes the corresponding data sets as well as internal data that is extracted from within the data sets. For example, a destination of a specific data set may be identified based on information that has been extracted from the specific data set and determined to correspond to the destination. Similarly, a destination of a particular data set may be identified based on information in the metadata of the particular data set that has been determined to correspond to the destination.

The destination for the data sets may include external destinations such as, for example, an external issuing bank as well as internal destinations such as, for example, downstream processes and applications. Then, the redacted data sets that correspond to the data sets may be transmitted to the determined destination in place of the data sets. The redacted data sets may be transmitted to the determined destination via digital communication channels such as, for example, emails, application programming interfaces, and graphical user interfaces as well as via analog communication channels such as, for example, facsimile transmission and postal transmission.

The redacted data sets may be transmitted and/or published to the determined destination by using at least one from among a secured communication channel and an unsecured communication channel. By redacting sensitive information in the redacted data sets, unsecured communication channels may be used for the transmitting and/or publishing of the redacted data sets without concern for unwanted dissemination of the sensitive information. Consistent with present disclosures, the redacted data sets may be transmitted to the determined destination instead of the corresponding data sets to take the place of the corresponding data sets. In effect, the redacted data sets may replace the corresponding data sets.

FIG. 5 is a flow diagram 500 of an exemplary process for implementing a method for providing automated redaction of structured and unstructured data sets in real-time by using artificial intelligence. FIG. 5 includes illustrations of a current business flow, a future business flow, and an additional use case. The future business flow and the additional use case may illustrate an exemplary implementation of the disclosed redaction invention.

As illustrated in FIG. 5, the future business flow may include a first step that includes cardholders providing issue documents that contain unprotected and sensitive information to an issuing bank via digital channels as well as via analog channels such as, for example, via facsimile transmission. The issuing bank may then transmit the unprotected information to a corresponding merchant's acquirer bank. The acquirer bank may implement the disclosed invention to redact and protect the sensitive information in the document. Finally, the acquirer bank may transmit the protected information to the merchant. As such, the merchant may not have access to the cardholder's sensitive information.

Furthermore, the additional use case may illustrate the cardholders uploading documents via mobile applications and/or web applications. Likewise, the merchants may also upload various types of documents via the mobile applications and/or the web applications. As the documents are uploaded, the disclosed invention may redact sensitive content in real-time, in near real-time, as well as in a batch by using a batch processing technique consistent with present disclosures. In another exemplary embodiment, sensitive information in any incoming documents may be redated by using the disclosed invention. The incoming documents may include email attachments such as, for example, presentation slides and electronic documents in a portable document format.

Figure 6:
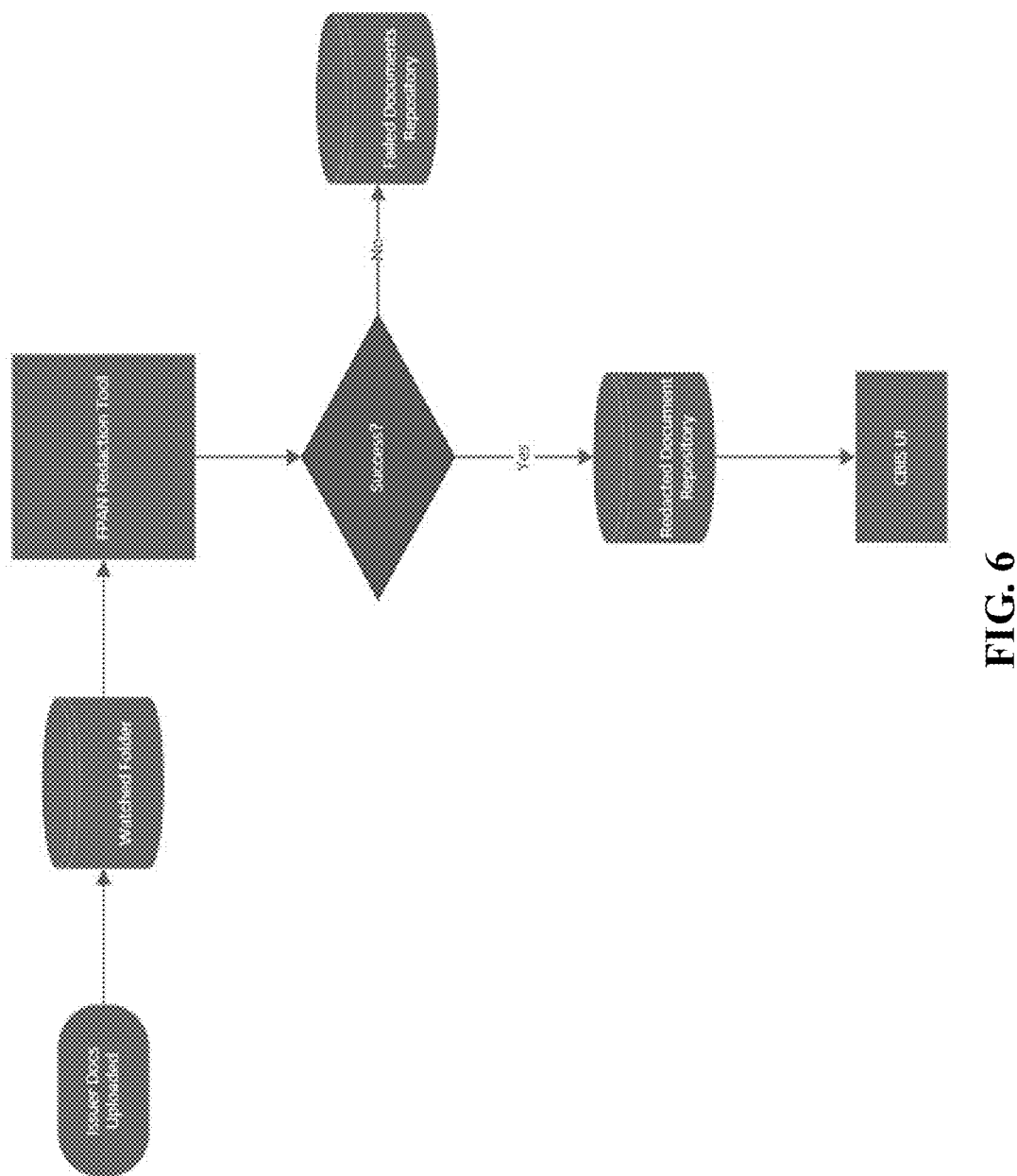
FIG. 6 is a technical flow diagram of an exemplary process for implementing a method for providing automated redaction of structured and unstructured data sets in real-time by using artificial intelligence.

FIG. 6 is a technical flow diagram 600 of an exemplary process for implementing a method for providing automated redaction of structured and unstructured data sets in real-time by using artificial intelligence. In FIG. 6, the disclosed invention may ensure that sensitive information is removed from documentation such as, for example, payment related documentation without compromising document integrity. The desensitized documents may be safely disseminated to clients by using unsecured transmission processes. The disclosed invention may further enhance security when implemented at the point of capture.

As illustrated in FIG. 6, issuer documents may be uploaded to a watched folder. The watched folder may relate to a folder in a computing system that automatically triggers a specific task when a file and/or folder is detected within. The issuer documents in the watched folder may automatically trigger the disclosed invention consistent with present disclosures. Then, the disclosed invention may determine whether the redaction is a success. The disclosed invention may transmit the issuer documents to a failed documents repository for further processing when it is determined that the redaction was not successful. The failed documents repository may automatically trigger a specific task when a file and/or folder is detected within.

Alternatively, when the redaction is successful, the disclosed invention may transmit the redacted issuer documents to a redacted document repository. The redacted document repository may automatically trigger a specific task when a file and/or folder is detected within. Processes consistent with present disclosures may then provide the redacted issuer documents in the redacted document repository to an intended destination such as, for example, a user interface.

Accordingly, with this technology, an optimized process for providing automated redaction of structured and unstructured data sets in real-time by using artificial intelligence is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing automated data redaction, the method being implemented by at least one processor, the method comprising:

receiving, by the at least one processor, a data set from a source, the data set including at least one from among an unstructured electronic document and a structured electronic document;

identifying, by the at least one processor using at least one model, at least one text from the data set based on pattern logic, wherein the pattern logic corresponds to pattern recognition used by the at least one model to identify patterns of text;

extracting, by the at least one processor using the at least one model, the at least one text identified by the at least one model based on the pattern logic;

mapping, by the at least one processor, the at least one text to a location in the data set, the location relating to a position of the at least one text on a page;

determining, by the at least one processor using the at least one model, whether the at least one text includes restricted information by:

identifying, using the at least one model, a contextual element associated with the at least one text, wherein the contextual element includes a grouping of at least one from among an alphabetic character, a numeric character, and a symbolic character of a natural language that provides a meaning of the at least one text; and analyzing the contextual element using a rule from a restricted information library to identify the restricted information;

redacting, by the at least one processor, the at least one text from the data set based on the mapping of the at least one text when the at least one text is determined to include the restricted information; and generating, by the at least one processor, a redacted data set based on a result of the redacting.

2. The method of claim 1, wherein data in the data set relates to private user information that is received via a graphical user interface of an application on a user device, the application including at least one from among a mobile application and a web application.

3. The method of claim 1, wherein the unstructured electronic document includes at least one from among a monochromatic visual representation and a polychromatic visual representation of information that relates to at least one from among an electronic image, an electronic picture, and an electronic photograph.

4. The method of claim 1, further comprising:

determining, by the at least one processor, a destination for the data set based on information that is associated with the data set; and transmitting, by the at least one processor, the redacted data set to the determined destination in place of the data set.

5. The method of claim 1, wherein extracting the at least one text from the data set further comprises:

processing, by the at least one processor using an image processing library, the data set, and using the processed data set for the identifying of the at least one text, wherein the processing includes reading and rescaling of an image of the data set and saving the rescaled image in a predetermined image format to facilitate the extracting of the at least one text.

6. The method of claim 1, further comprising:

receiving, by the at least one processor via a graphical user interface, at least one restriction requirement, the at least one restriction requirement including at least one from among a policy and a regulatory guideline that defines the restricted information; and updating, by the at least one processor, the restricted information library based on the at least one restriction requirement.

7. The method of claim 1, wherein the redacted data set corresponds to a redacted reproduction of the data set with a mirroring data structure and content, the redacted data set including data in a data format that corresponds to the data set.

8. The method of claim 1, wherein the at least one model includes at least one from among a machine learning model, a natural language processing model, a statistical model, a mathematical model, a process model, and a data model.

9. The method of claim 1, wherein the data set includes a plurality of data sets, and wherein the extracting of the at least one text includes batch processing to aggregate the plurality of data sets into a batch prior to the extracting.

10. A computing device configured to implement an execution of a method for providing automated data redaction, the computing device comprising:

a processor;

a memory; and a communication interface coupled to each of the processor and the memory, wherein the processor is configured to:

receive a data set from a source, the data set including at least one from among an unstructured electronic document and a structured electronic document;

identify, using at least one model, at least one text from the data set based on pattern logic, wherein the pattern logic corresponds to pattern recognition used by the at least one model to identify patterns of text;

extract, by using the at least one model, the at least one text identified by the at least one model based on the pattern logic;

map the at least one text to a location in the data set, the location relating to a position of the at least one text on a page;

determine, by using the at least one model, whether the at least one text includes restricted information by:

identifying, using the at least one model, a contextual element associated with the at least one text, wherein the contextual element includes a grouping of at least one from among an alphabetic character, a numeric character, and a symbolic character of a natural language that provides a meaning of the at least one text; and analyzing the contextual element using a rule from a restricted information library to identify the restricted information;

redact the at least one text from the data set based on the mapping of the at least one text when the at least one text is determined to include the restricted information; and generate a redacted data set based on a result of the redacting.

11. The computing device of claim 10, wherein data in the data set relates to private user information that is received via a graphical user interface of an application on a user device, the application including at least one from among a mobile application and a web application.

12. The computing device of claim 10, wherein the unstructured electronic document includes at least one from among a monochromatic visual representation and a polychromatic visual representation of information that relates to at least one from among an electronic image, an electronic picture, and an electronic photograph.

13. The computing device of claim 10, wherein the processor is further configured to:

determine a destination for the data set based on information that is associated with the data set; and transmit the redacted data set to the determined destination in place of the data set.

14. The computing device of claim 10, wherein, to extract the at least one text from the data set, the processor is further configured to:

process, by using an image processing library, the data set, and use the processed data set for the identifying of the at least one text, wherein the processing includes reading and rescaling of an image of the data set and saving the rescaled image in a predetermined image format to facilitate the extracting of the at least one text.

15. The computing device of claim 10, wherein the processor is further configured to:

receive, via a graphical user interface, at least one restriction requirement, the at least one restriction requirement including at least one from among a policy and a regulatory guideline that defines the restricted information; and update the restricted information library based on the at least one restriction requirement.

16. The computing device of claim 10, wherein the redacted data set corresponds to a redacted reproduction of the data set with a mirroring data structure and content, the redacted data set including data in a data format that corresponds to the data set.

17. The computing device of claim 10, wherein the at least one model includes at least one from among a machine learning model, a natural language processing model, a statistical model, a mathematical model, a process model, and a data model.

18. The computing device of claim 10, wherein the data set includes a plurality of data sets, and wherein the extracting of the at least one text includes batch processing to aggregate the plurality of data sets into a batch prior to the extracting.

19. A non-transitory computer readable storage medium storing instructions for providing automated data redaction, the storage medium comprising executable code which, when executed by a processor, causes the processor to:

receive a data set from a source, the data set including at least one from among an unstructured electronic document and a structured electronic document;

identify, using at least one model, at least one text from the data set based on pattern logic, wherein the pattern logic corresponds to pattern recognition used by the at least one model to identify patterns of text;

extract, by using the at least one model, the at least one text identified by the at least one model based on the pattern logic;

map the at least one text to a location in the data set, the location relating to a position of the at least one text on a page;

determine, by using the at least one model, whether the at least one text includes restricted information by:

identifying, using the at least one model, a contextual element associated with the at least one text, wherein the contextual element includes a grouping of at least one from among an alphabetic character, a numeric character, and a symbolic character of a natural language that provides a meaning of the at least one text; and analyzing the contextual element using a rule from a restricted information library to identify the restricted information;

redact the at least one text from the data set based on the mapping of the at least one text when the at least one text is determined to include the restricted information; and generate a redacted data set based on a result of the redacting.

20. The storage medium of claim 19, wherein data in the data set relates to private user information that is received via a graphical user interface of an application on a user device, the application including at least one from among a mobile application and a web application.

* * * * *